Aug. 18, 1959 S. E. LOGAN 2,900,199
PIPE SEAL
Filed April 20, 1953

Inventor:
Stanley E. Logan,
by Richard E. Hosley
His Attorney.

United States Patent Office 2,900,199
Patented Aug. 18, 1959

2,900,199
PIPE SEAL

Stanley E. Logan, Round Lake, N.Y., assignor to General Electric Company, a corporation of New York Application April 20, 1953, Serial No. 349,678

7 Claims. (Cl. 285—187)

This invention generally relates to a fluid tight seal, and more particularly to a temperature compensated seal for preventing the leakage of either ambient temperature fluids or low temperature fluids through an opening of a pressurized container.

For interconnecting the various pipes, valves, storage tanks and other components of hydraulic piping systems, empoyed in transporting fluids from one place to another, numerous coupling members are used. It is desirable that these couplings generally be light in weight, be simply constructed so as to permit the ready connection and disconnection of the system components at ambient temperatures, and most importantly embody an efficient sealing means for providing a fluid tight connection at the opening, such that pressurization of the system by the passage of fluids therethrough or the storage of pressurized fluids in contact therewith will not result in leakage of the fluids through this opening.

Heretofore one manner of coupling hydraulic components such as pipes has been to supply the confronting ends of these pipes, or other members to be joined, with complementary upstanding flanges and in conjunction therewith provide means such as peripherally engaging clamps or bolts for joining these flanges in abutting relation. For then sealing this coupled joint to insure against the leakage of fluids therethrough, a gasket member has been provided intermediate the adjoining pipe edges and enclosed by the abutting flanges; the gasket member having a surface which is forced by the clamping of the flanges against the joint formed thereby, to effectively seal any opening against the escape of fluids therethrough.

Although these couplings and gasket sealing means therefor have proved to be fluid tight when employed in hydraulic systems handling fluids at ambient temperature or at temperatures slightly varying therefrom, many have proved unsatisfactory when employed in piping systems for storing and transporting low temperature fluids; such as liquid oxygen or liquid nitrogen whose temperatures fall within the range of —300° F. to —320° F. This failure has been attributed to the fact that the coupling and gasket having been assembled and sealed to provide a fluid tight joint at ambient tmperatures thereafter unequally contract when exposed to the low temperatures of the fluid to loosen the fluid tight contact of the gasket against the flange and thereby enable the pressure exerted by the confined low temperature fluids to force said fluids through the now improperly sealed surfaces.

Three types of gaskets heretofore employed to seal such couplings are a metallic gasket of non-deformable metal, a metallic gasket of deformable metal, and a non-metallic gasket of Teflon, rubber, or the like. The hard metallic gasket, although comprised of a metal having the same or a lower temperature coefficient of contraction than the adjoining pipe and flanges, and therefore theoretically presenting an efficient seal at either ambient or low temperatures, effects such a seal by a metal-to-metal contact with the joined members. Therefore, this metal-to-metal seal requires accurately machined mating members having fine surface finishes and a large clamping force tightly pressing the gasket against these abutted mating edges. To provide a sufficiently large force insuring a fluid tight seal by these metallic members requires that the pipe flanges be heavy, bulky, and generally difficult and time consuming to assemble and disassemble thereby rendering such a connection both impractical and costly. Employing deformable metallic gaskets, such as lead, readily effects a fluid tight seal at the ambient temperatures of assembly without the need for the excessively large clamping forces required for harder and less deformable metals. However, these deformable gaskets, of softer metals, have a greater thermal contraction with temperature than the adjoining piping and flange members resulting in the seal mating surfaces leaking when exposed to the severely low temperature fluids. Employing the third type of gasket, of non-metallic material such as rubber or Teflon, which materials being resilient may be readily deformed to assume the configuration of the envelope formed by the abutting flanges, results in a seal that is highly effective at ambient temperatures. However, inasmuch as these non-metallic materials also have a greater thermal contraction than the surrounding piping and flanges, leakage occurs at low temperatures. For example, in the case of a rubber gasket, the material, although soft and deformable at ambient temperatures, becomes hard and relatively brittle at very low temperatures and literally shrinks away from the flanges to expose openings through the abutted edges thereof enabling the fluid pressure within the pipe to force fluid through these exposed openings.

To correct for this problem and provide a gasket type insert for sealing a flange coupling, which seal is effective at both ambient and very low temperatures, and in addition thereto, may be readily assembled at ambient temperature within an inexpensive and light weight coupling, the present invention in one form thereof is directed.

In accordance with this one illustrative embodiment of the invention a gasket type seal is provided for a pipe coupling which has both a deformable surface readily configured by small clamping forces to effect a fluid tight closure thereof; and moreover possesses a means for increasing this fluid tight closure as the low temperature fluid is brought in contact therewith; thereby providing a fluid tight seal whose effectiveness increases rather than decreases as the severely low temperatures of the liquefied gaseous fluids are conducted therethrough.

Inasmuch as none of the presently known gasket materials possess such characteristics, the present invention provides a novel gasket comprised of a hybrid combination of both a non-deformable metallic gasket and a deformable non-metallic gasket; this hybrid type gasket being characterized by the compressible sealing surface possessed by the non-metallic gasket and the low temperature coefficient of contraction possessed by the hard metallic gasket while possessing none of the disadvantages of these devices discussed above.

It is accordingly one object of this invention to provide a fluid tight seal for preventing fluid leakage through a pressurized opening.

A further object of this invention is to provide a temperature compensated gasket for efficiently sealing a hydraulic coupling against leakage at both ambient and severely low temperatures.

A further object of this invention is to provide a light weight hydraulic coupling having efficient sealing means at both ambient and low temperatures.

A further object of this invention is to provide a light weight and fluid tight coupling which may be readily assembled and disassembled at ambient temperatures.

A still further object of this invention is to provide a hydraulic coupling for joining components of a hydraulic system which may be readily assembled and disassembled at ambient temperatures, and embodying a fluid tight seal at both ambient and severely low temperatures.

Other objects and many attendant advantages will be more clearly comprehended from the following detailed description of the present invention taken in conjunction with the accompanying drawings in which.

Figure 1:
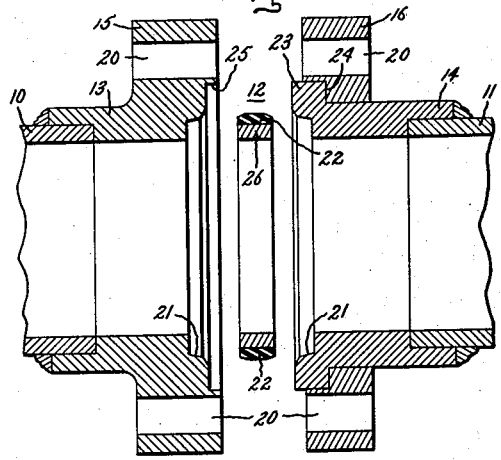
Fig. 1 is a side elevational view, in section, illustrating one preferred coupling and seal therefor, in diassembled relation.
Figure 2:
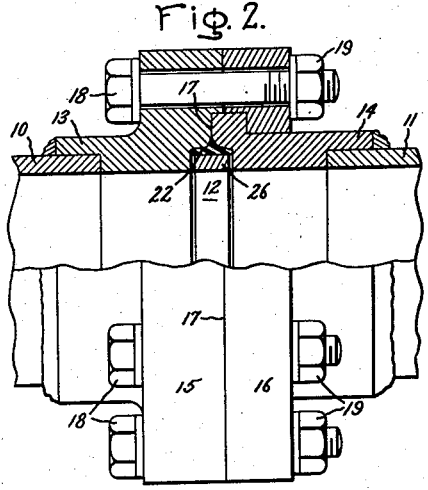
Fig. 2 is a side elevational view of the coupling of Fig. 1, partly in section, and illustrating the parts thereof in assembled relation.

Referring now to the exploded and assembled views of Figs. 1 and 2 for a detailed consideration of one preferred hydraulic coupling for joining two fluid conducting passages, generally designated 10 and 11, and in particular to one preferred embodiment of a temperature compensated gasket 12 for efficiently sealing said coupling against the escape of fluids therethrough at both ambient and low temperatures. The confronting ends of the cylindrical fluid carrying passages 10 and 11, comprised of aluminum pipes or the like, are provided with complementary coupling members 13 and 14, having upstanding flange members 15 and 16 associated therewith and adapted to mate in abutting relation along a peripheral joint 17, as clearly shown by Fig. 2, to thereby provide a continuous path for the fluids passing from passage 10 to passage 11. For securely retaining these coupling members in the abutted relation illustrated by Fig. 2, and thus maintaining the continuous fluid path from passage 10 to passage 11, means such as a plurality of bolts 18 and engaging nuts 19 therefor are provided to secure the flanges tightly together. As is well-known in the art, these retaining bolts and nuts being positioned around the periphery of the coupling may securely join the coupled members by passing through a plurality of axially aligned holes 20 in each of the upstanding flange members 15 and 16, and thus upon being tightened, draw these flanges and the passages associated therewith tightly together. For sealing peripheral joint 17 against the escape of pressurized fluids therethrough, a ring gasket member 12 is provided intermediate coupling members 13 and 14 and enclosed by portions of the abutting flanges 15 and 16. Concentrically arranged grooves having groove surfaces 21 cut within coupling members 13 and 14 provide an opening for receiving gasket member 12, such that the peripheral surface 22 thereof, snugly nests against groove surfaces 21 upon the clamping of the flanges together, to provide a fluid tight seal as shown by Fig. 2.

In accordance with the embodiment of the invention illustrated by Figs. 1 and 2, cylindrical coupling member 13 and flange 15 upstanding therefrom, may be integrally formed of aluminum or other metal having a high thermal coefficient of contraction; and this member may be concentrically lap fitted onto pipe 10 and welded thereto, as shown. For ease of assembly, however, the second coupling member 14, of similar material, is preferably formed with a shorter flanged lip portion 23, integral therewith; and additionally provided with a loose aluminum ring having a notched portion 24 complementary with lip 23 to form the upstanding flange 16.

For providing an interlocking engagement of the coupling members 13 and 14, the mating edge of loose ring 16 may be offset from being flush with the edge of coupling section 14 as shown, and opposite coupling member 13 may then be additionally concentrically grooved at 25 so as to complement this offset surface arrangement, thereby enabling the mating of these members along two offset joints 17, as shown by Fig. 2.

Now for providing a fluid tight sealing means for this coupling which may be readily assembled with small tightening forces at ambient temperature to provide a leakproof connection of the members, and will efficiently seal the coupling as low temperature fluids are passed therethrough, which low temperatures may drop to the order of −320° F. (liquid nitrogen) or below if other liquefied gases are employed, a novel hybrid type gasket member 12 is provided. Gasket member 12 is defined as a hybrid gasket because it possesses the combined advantageous features of both the prior deformable non-metallic type gaskets, and the prior relatively nondeformable type metallic gaskets; while eliminating or providing compensation for the disadvantages of these devices. Referring to the drawings, gasket 12 is preferably comprised of two concentrically arranged rings, bonded together. The inner ring 26, termed the spacer ring, is preferably formed in rectangular cross section of low thermal contraction material, such as the metal titanium or the alloys of nickel and iron, whose shrinkage as the temperature is lowered is much less than that of the surrounding coupling members 13 and 14, which in the embodiment illustrated may be comprised of aluminum. The outer ring 22, termed the seal ring, is preferably formed of a molded suitable sealing material which is soft and readily compressible by small forces at ambient temperature, such as an elastic form of rubber or synthetic rubber.

When the hybrid gasket member 12 is inserted intermediate coupling sections 13 and 14 at ambient temperature and the flanges tightened together by means of the bolts and nuts 18 and 19, outer seal ring 22, being soft and deformable, is readily squeezed intermediate these coupling members by relatively small tightening forces to fill any potential leakage paths across the surfaces of grooves 21 and effectively seal the coupling against leakage. As the low temperature liquefied gases are conducted through the passages and coupling, coupling sections 13 and 14 shrink in volume, and accordingly the grooved envelope housing gasket 12 also constricts, shrinking the space about the gasket. Outer seal ring 22 of gasket 12, being comprised of rubber or synthetic rubber, becomes stiff and also constricts in volume. However, inasmuch as the inner spacer ring 26 has a lower thermal contraction than the coupling sections, and, as shown, has a sufficiently large diameter relative to the overall gasket diameter, the space housing the gasket diminishes a greater amount than the gasket itself. This result effects a tighter squeeze on the gasket than before, forcing the now stiffened outer seal ring 22 more tightly against the surfaces of the grooves 21 of abutted members 13 and 14 and enabling a more effective seal of joint 17. Thus it may be readily comprehended that the presently proposed hybrid type gasket 12 receives a greater and greater compressive stress as the temperature is lowered, and provides a temperature compensated fluid tight seal whose effectiveness increases rather than decreases as the temperature is lowered. Furthermore, the increase in gasket stress as the temperature is lowered is accomplished in the radial direction such that the required clamping force provided by bolts 18 and nuts 19 is not increased.

Referring again to Figs. 1 and 2, it is noted that the sides 21 of the grooved openings of coupling sections 13 and 14, which form the enclosure for housing gasket 12, are beveled; and similarly the edges of gasket outer seal ring 22 are also beveled. This arrangement aids assembly and disassembly by rendering the gasket easily insertable and removable from the coupling envelope.

Figure 2A:
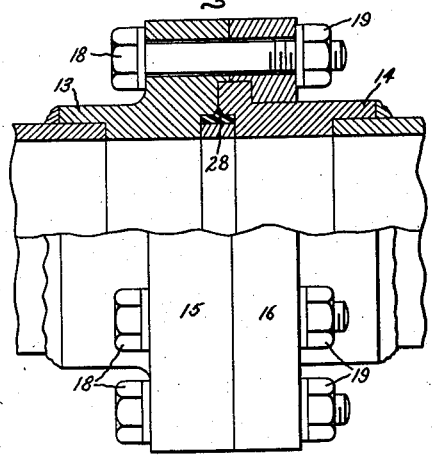
Fig. 2a is a partial sectional view similar to Fig. 2, and illustrating a modification thereof.

In accordance with a modified form of this invention as illustrated by the cross-sectional view of Fig. 2a, the opening formed between the abutted coupling sections 13 and 14, forming the gasket housing, may be formed in substantially rectangular cross section without the beveled edge of Fig. 1 whereby the outer seal ring 28 of the gasket may be the same as in Fig. 1 or may also be molded in rectangular cross section, as shown, if desired.

Figure 2B:
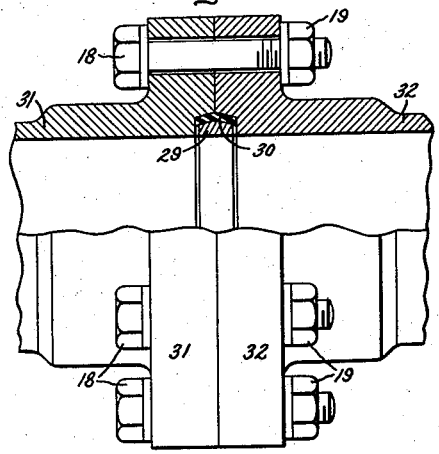
Fig. 2b is a view similar to Fig. 2 illustrating an additional modification of the embodiment of Fig. 2.

Similarly, Fig. 2b illustrates an additional modification of this arrangement wherein both the gasket inner spacer ring 29, and the outer seal ring 30 are each jointly modified to provide a gasket having a substantially square cross section whose upper edges are beveled at a slight angle to meet at a point coincident with the joint formed by the abutted coupling sections 31 and 32. Coupling sections 31 and 32 being complementarily grooved to properly receive this beveled gasket.

Figure 2C:
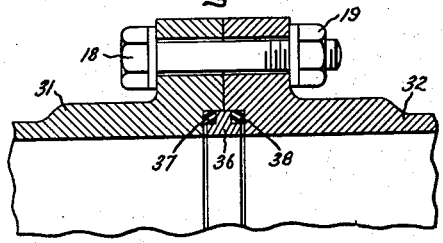
Fig. 2c is a partial sectional view similar to Fig. 2, and illustrating a modification thereof.

Fig. 2c illustrates a further modification of this arrangement wherein the spacer ring 36 is in T-shaped cross section, and two seal rings 37 and 38 of circular cross section or rectangular cross section, as shown, are placed on opposite sides of the T-leg.

Each of these modifications, of course, operate in basically the same manner as the embodiment illustrated in Figs. 1 and 2, despite their varying configuration, for the outer seal ring of each gasket is readily deformed against the coupling surfaces at ambient temperature to provide a fluid tight seal for the coupled sections of the pipe, and the low thermal contracting inner spacer ring compensates for the contraction of the outer ring as the temperature is lowered to effectively increase the compression stresses thereon and maintain the seal effectively leak-proof.

Figure 3:
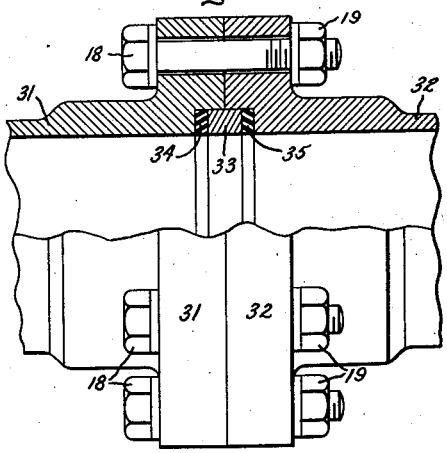
Fig. 3 is an additional view, similar to Fig. 2, illustrating a second embodiment of the invention.

In accordance with a second embodiment of the invention, as illustrated by the partially sectioned view of Fig. 3, a differently constructed hybrid type gasket member is proposed. This alternative gasket seal, although comprised of a highly deformable non-metallic seal ring portion and a low thermal contraction spacer ring portion of non-deformable metal, to compensate therefor, differs from the thermally compensated gasket of Figs. 1 and 2 in placing these portions in a side by side or axial arrangement rather than in a concentric arrangement.

Forming this gasket by a side-by-side placement of these gasket portions, provides an axial type seal rather than a diametral type seal, that is, seals the side surfaces of the gasket envelope against the passage of fluids therethrough rather than the upper surfaces 21. Referring specifically to Fig. 3 for an understanding of this gasket construction and its operation, a low thermal contraction spacer ring 33, of rectangular cross section is provided with separate seal rings 34 and 35 of deformable sealing material on either side thereof. The gasket formed by these three members is sandwiched between the abutting coupling sections 31 and 32, and axially compressed by the shoulders of these grooves as the flanges are drawn together. This compression of the two seal rings against the coupled sections, seals the junctions thereof against the passage of fluids therethrough. As the temperature of the coupling and gasket is lowered by the passage of liquefied gases through the pipes and coupling, the spacer ring compensates for the contraction of the seal rings, by deforming the sealing rings to maintain tightly closed any resulting diametral or axial openings.

It is to be noted that the coupling sections of Figs. 2b, 2c and 3 also differ from the coupling sections 13 and 14 of Figs. 1 and 2 in being comprised of two symmetrical cylindrical nipples 31 and 32 having coextensive upstanding flanges formed integral therewith, and adapted to abut along a single continuous surface; rather than the irregularly surfaced interlocking flange couplings 15 and 16 of Figs. 1 and 2. These nipples 31 and 32 may be formed of separate cylindrical sections concentrically lap fitted onto pipes 10 and 11, in a manner similar to the connections of Figs. 1 and 2, or formed integral with these pipe sections as shown.

Although this invention has been illustrated and described above as a ring gasket having an axial or diametral sealing surface adapted to be sandwiched between cylindrical coupling sections of fluid conducting passages, it is of course contemplated that hybrid seals embodying the above discussed principles may be readily devised in other configurations for performing other functions, such as for low temperature sealing of valve components, coverplates, electrical leads from fluid containers and many others. Similarly, other variations may be readily contemplated by those skilled in this art in accordance with the basic invention. Therefore this invention is to be considered as limited only in accordance with the basic features thereof as set forth in the claims appended thereto.

What I claim as new and desire to secure by Letters Patent of the United States is:

1. In combination a fluid container having a passage for containing low temperature fluids and having portions of the container defining an opening through the container leading from the passage, said container portions additionally defining a recess leading to said opening and formed within said container, a gasket sealing means positionable within said recess, said gasket including a seal member of easily deformable material having a greater coefficient of thermal contraction than said container and adapted to nest within the recess against said container, a spacer member having a lower thermal coefficient of contraction than said container and positioned against said seal member to hold said seal member against said container, the overall thermal coefficient of contraction of said gasket being lower than that of the container whereby said gasket provides an efficient seal at ambient temperature and retains its sealing effectiveness as the temperature is lowered due to increased compressive forces being placed on the gasket by virtue of the greater contraction of the recessed portions of the container than that of the gasket.

2. In combination, a fluid holding container having two abutted conduits each recessed as to provide a pocket within the container leading to the abutment joint, and a temperature compensated gasket within said pocket for sealing the abutment joint, said gasket including a spacer member having a lower thermal coefficient of contraction than said container and a packing of easily deformable material having a higher coefficient of contraction than said container, said packing being held against the recessed portions of the conduits by the spacer member to deform thereagainst, the resulting overall thermal coefficient of contraction of said packing and spacer member being lower than that of the container whereby said gasket provides an efficient seal at ambient temperature and retains its sealing effectiveness as the temperature is lowered by virtue of the greater contraction of the container pocket than that of the gasket.

3. In combination a fluid holding container having two abutted tubular conduits, each having portions that are recessed to provide a pocket within the container leading to the abutment joint and a temperature compensated gasket within said pocket for sealing the abutment joint, said gasket including a spacer ring of material having a lower thermal coefficient of contraction than said container and a sealing ring peripherally supported about the outer surface of the spacer ring and held by said spacer ring against portions of the container forming the pocket, said sealing ring being of a readily deformable material and having a greater thermal coefficient of contraction than said container, the overall thermal coefficient of contraction of said gasket being lower than that of said container, whereby said gasket possesses a readily deformable surface at ambient temperature and a smaller volumetric shrinkage than said pocket as the temperature is lowered.

4. In combination a fluid holding container having two abutted conduits, each recessed as to provide a pocket within the container leading to the abutment joint and a temperature compensated gasket within said pocket for sealing the abutment joint, said gasket including two concentrically positioned rings, the inner ring having a lower thermal coefficient of contraction than said container, and the outer ring being of a material which is highly deformable with small force at ambient temperature and possessing a greater thermal coefficient of contraction than said container, the outer ring being held by the inner ring against portions of the conduits forming said pocket, the diameter of the inner ring being sufficiently greater than the thickness of the outer ring that the thermal coefficient of contraction of the overall gasket is lower than that of the container.

5. In combination, a fluid holding container having two abutted conduits, each recessed as to provide a pocket within the container leading to the abutment joint and a temperature compensated gasket within said pocket for sealing the abutment joint, said gasket including three rings positioned in axial alignment, the two outer rings being comprised of material which is highly deformable with small force at ambient temperature and possessing a greater thermal coefficient of contraction than said container, and the intermediate ring being of material having a lower thermal coefficient of contraction than said container, the axial thickness of the intermediate ring being sufficiently greater than the combined axial thicknesses of the outer rings that the thermal coefficient of contraction of the overall gasket is lower than that of the container whereby said gasket provides an efficient seal at ambient temperature and retains its sealing effectiveness as the temperature is lowered by virtue of the greater contraction of the container pocket than that of the gasket.

6. In a fluid container having a passage for containing low temperature fluids and having portions of the container defining an opening leading from the passage and through the container wall, and said container portions additionally defining a recess within said container leading to said opening for housing a gasket to prevent the escape of fluid therethrough, the improvement in said gasket for self-sealing said opening as low temperature fluids are introduced into said container comprising: at least one seal member of easily deformable material having a greater thermal coefficient of contraction than said container and positionable to nest against container portions defining said recess, a spacer member of material having a lower thermal coefficient of contraction than said container supported against said seal member and holding said seal against said portions, the overall thermal coefficient of contraction of the gasket being lower than that of the container, whereby said gasket provides an efficient seal at ambient temperature and retains its sealing effectiveness as the temperature is lowered by virtue of the greater contraction of the container recess than that of the gasket.

7. In a pipe coupling comprising two tubular members, each of which has a radially extending flange at one end thereof, said flanges engaging each other to form an abutment joint between the two tubular members, each of said tubular members having a recess formed in its inner periphery at one end, said recesses defining an annular groove having side walls and a bottom wall and opening toward the interior of said tubular members, said abutment joint intersecting the bottom wall of said groove, a temperature compensated gasket positioned within said groove and sealing the abutment joint between the two tubular members against the escape of fluid therethrough, said gasket including a spacer ring of material having a lower thermal coefficient of contraction than the two tubular members, a sealing ring peripherally supported about the radially outer surface of the spacer ring, said sealing ring being of readily deformable material and having a greater coefficient of contraction than said two tubular members, the resulting overall thermal coefficient of contraction of the spacer ring and the sealing ring which comprised the gasket being lower than that of the two tubular members, whereby said gasket provides an efficient seal at ambient temperature and retains its sealing effectiveness as the temperature is lowered due to increased compressive forces being placed on the sealing ring by virtue of a greater contraction of the walls of the groove relative to that of the spacer ring.

References Cited in the file of this patent

UNITED STATES PATENTS

| | | |
|---|---|---|
| 696,106 | Osborne | Mar. 25, 1902 |
| 813,454 | Schaad | Feb. 27, 1906 |
| 906,761 | White | Dec. 15, 1908 |
| 1,295,263 | Blom | Feb. 25, 1919 |
| 1,523,817 | Long | Jan. 20, 1925 |
| 1,821,867 | Wilson | Sept. 1, 1931 |
| 2,112,832 | Douglas et al. | Apr. 5, 1938 |
| 2,260,542 | Shaffer | Oct. 28, 1941 |
| 2,513,178 | Jackson | June 27, 1950 |
| 2,575,213 | Fruth | Nov. 13, 1951 |
| 2,646,997 | Magos et al. | July 28, 1953 |

FOREIGN PATENTS

| | | |
|---|---|---|
| 641,322 | Great Britain | Aug. 9, 1950 |